(12) United States Patent
Ellmauthaler et al.

(10) Patent No.: US 10,444,391 B2
(45) Date of Patent: Oct. 15, 2019

(54) NOISE REMOVAL FOR DISTRIBUTED ACOUSTIC SENSING DATA

(71) Applicant: Halliburton Energy Services, Inc., Houston, TX (US)

(72) Inventors: Andreas Ellmauthaler, Rio de Janeiro (BR); Mark Elliott Willis, Katy, TX (US); David Andrew Barfoot, Houston, TX (US); Kristoffer Thomas Walker, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 367 days.

(21) Appl. No.: 15/502,021

(22) PCT Filed: Aug. 13, 2015

(86) PCT No.: PCT/US2015/045092
§ 371 (c)(1),
(2) Date: Feb. 6, 2017

(87) PCT Pub. No.: WO2016/039928
PCT Pub. Date: Mar. 17, 2016

(65) Prior Publication Data
US 2017/0235006 A1 Aug. 17, 2017

Related U.S. Application Data

(60) Provisional application No. 62/049,924, filed on Sep. 12, 2014.

(51) Int. Cl.
*G01V 1/42* (2006.01)
*G01V 1/22* (2006.01)
*G01H 9/00* (2006.01)

(52) U.S. Cl.
CPC ............... *G01V 1/42* (2013.01); *G01H 9/004* (2013.01); *G01V 1/226* (2013.01);
(Continued)

(58) Field of Classification Search
CPC ...... G01V 1/42; G01V 1/226; G01V 2210/20; G01V 2210/30; G01V 2210/161; G01V 2200/14; G01H 9/004
See application file for complete search history.

(56) References Cited

U.S. PATENT DOCUMENTS

| 4,853,903 A | 8/1989 | Linville, Jr. et al. |
| 6,393,365 B1 | 5/2002 | Runnestrand et al. |

(Continued)

OTHER PUBLICATIONS

European Search Report issued in related European Application No. 15839428.8 dated Jan. 30, 2018 (7 pages).
(Continued)

*Primary Examiner* — Bryan Bui
(74) *Attorney, Agent, or Firm* — Benjamin Fite; Baker Botts L.L.P.

(57) ABSTRACT

An example method includes at least partially positioning within a wellbore an optical fiber of a distributed acoustic sensing (DAS) data collection system. Seismic data from the DAS data collection system may be received. The seismic data may include seismic traces associated with a plurality of depths in the wellbore. A quality factor may be determined for each seismic trace. One or more seismic traces may be removed from the seismic data based, at least in part, on the determined quality factors.

20 Claims, 11 Drawing Sheets

(52) U.S. Cl.
CPC .... *G01V 2200/14* (2013.01); *G01V 2210/161* (2013.01); *G01V 2210/20* (2013.01); *G01V 2210/30* (2013.01)

(56) References Cited

U.S. PATENT DOCUMENTS

| | | |
|---|---|---|
| 6,463,387 B1 | 10/2002 | Runnestrand et al. |
| 2003/0067843 A1 | 4/2003 | Therond et al. |
| 2010/0200743 A1 | 8/2010 | Forster et al. |
| 2010/0315901 A1 | 12/2010 | Coman et al. |
| 2010/0329079 A1 | 12/2010 | Hegge et al. |
| 2012/0035854 A1 | 2/2012 | Kragh et al. |
| 2012/0111560 A1 | 5/2012 | Hill et al. |
| 2013/0100768 A1 | 4/2013 | Lopez et al. |
| 2013/0242698 A1 | 9/2013 | McEwen-King et al. |
| 2013/0265851 A1 | 10/2013 | Faber et al. |
| 2017/0090054 A1* | 3/2017 | Willis .................... G01H 9/004 |

OTHER PUBLICATIONS

International Preliminary Report on Patentability issued in related Application No. PCT/US2015/045092 dated Mar. 23, 2017 (11 pages).

International Search Report and Written Opinion issued in related PCT Application No. PCT/US2015/045092 dated Oct. 26, 2015, 14 pages.

\* cited by examiner

NOISE REMOVAL FOR DISTRIBUTED ACOUSTIC SENSING DATA

CROSS-REFERENCE TO RELATED APPLICATION

The present application is a U.S. National Stage Application of International Application No. PCT/US2015/045092 filed Aug. 13, 2015, which claims benefit of U.S. Provisional Application No. 62/049,924, entitled "NOISE REMOVAL FOR DISTRIBUTED ACOUSTIC SENSING DATA" filed Sep. 12, 2014, both of which are incorporated herein by reference in their entirety for all purposes.

BACKGROUND

This disclosure generally relates to monitoring of hydrocarbon wellbores. In particular, this disclosure relates to noise removal for Distributed Acoustic Sensing (DAS) data.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore through and/or into the subterranean formation at a desired well site, treating the wellbore to optimize production of hydrocarbons, and performing the necessary steps to produce and process the hydrocarbons from the subterranean formation. Some or all of these steps may require and utilize measurements and other sensed data to determine characteristics of the formation, the hydrocarbon, the equipment used in the operations, etc.

One example type of sensed data comprises seismic data in the form of a vertical seismic profile (VSP). VSP may refer to the measurement of seismic/acoustic energy in a wellbore originating from a seismic source at the surface of the wellbore (e.g., a vibrator truck, air gun, and/or explosives). In certain instances DAS may be used to acquire the seismic data necessary to form the VSP. Acoustic sensing based on DAS may use the Rayleigh backscatter property of a fiber's optical core and may spatially detect disturbances that are distributed along a length of fiber positioned within a wellbore. DAS data may, however, suffer from noise artifacts that can reduce the accuracy of the seismic data and any calculations performed using the seismic data.

BRIEF DESCRIPTIONS OF THE DRAWINGS

These drawings illustrate certain aspects of certain embodiments of the present disclosure. They should not be used to limit or define the disclosure.

Figure 9A:
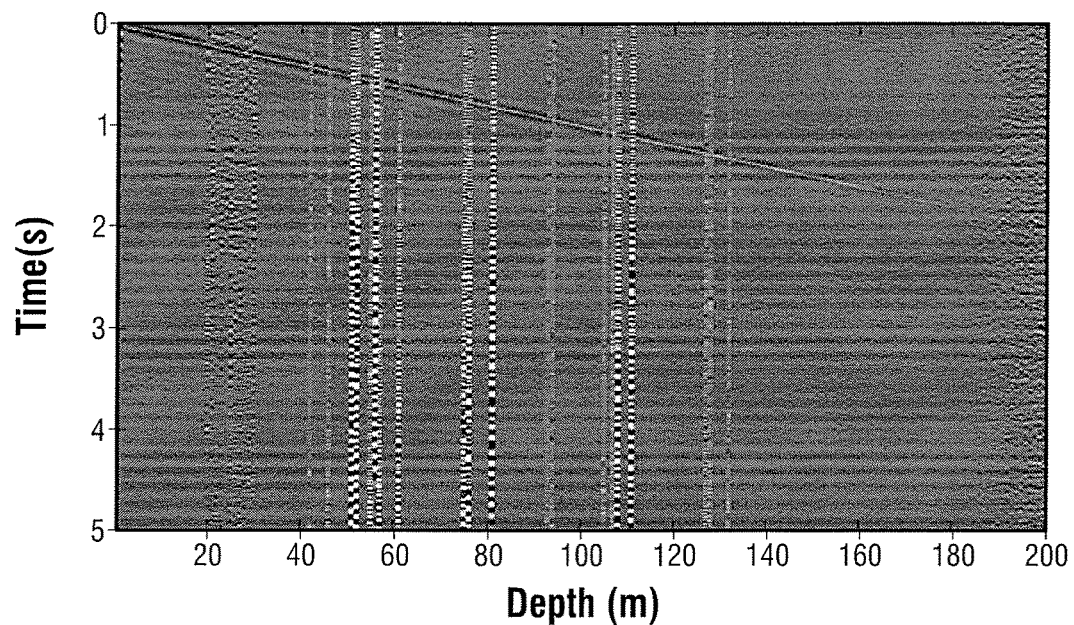
Figure 9B:
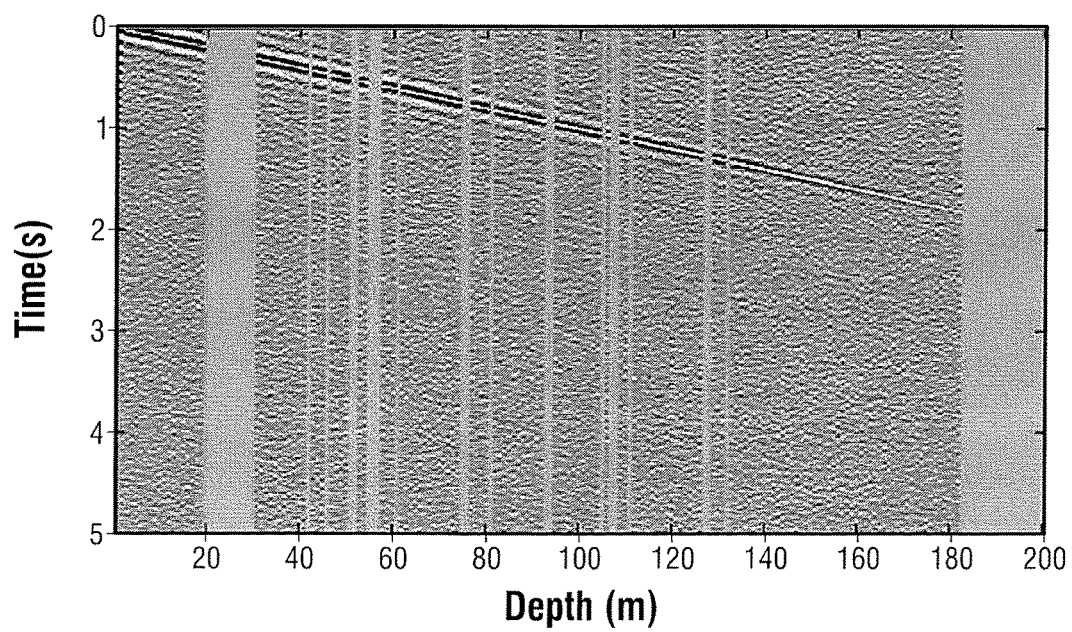
Figure 10:
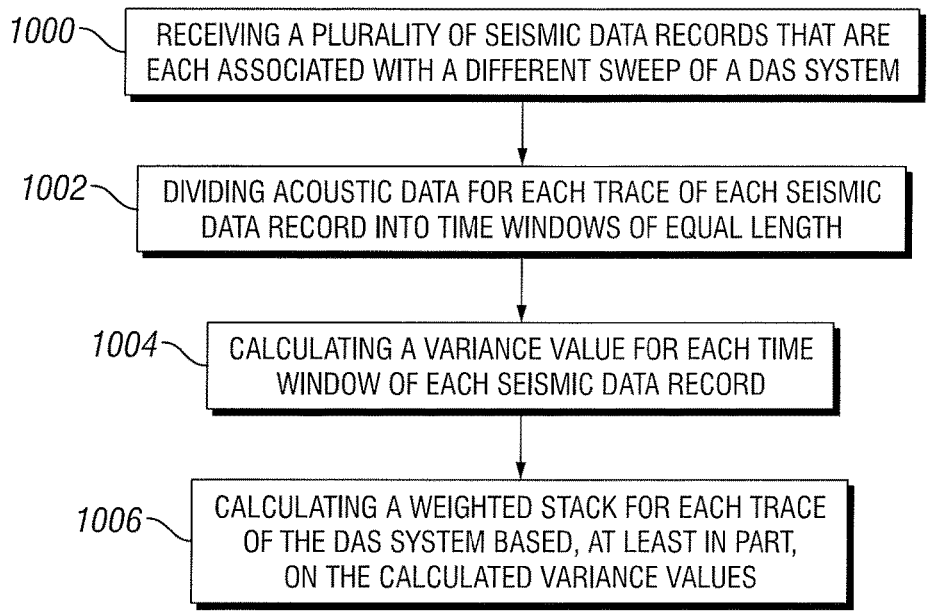
Figure 11:
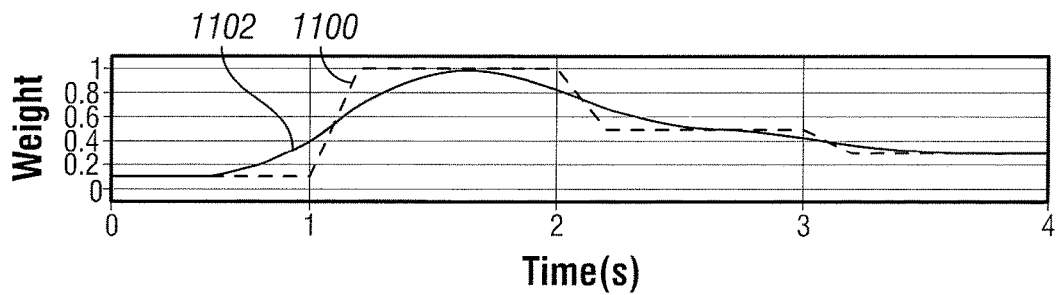

FIGS. 9A-9B illustrate an example DAS VSP data set before and after applying noise reduction techniques in accordance with embodiments of the present disclosure; and FIG. 10 illustrates an example process for noise reduction through a variance-based weighted stacking scheme in accordance with embodiments of the present disclosure; and FIG. 11 illustrates an example linear interpolation of calculated variance values in accordance with embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

As stated above, VSP may refer to the measurement of seismic/acoustic energy in a wellbore originating from a seismic source at the surface of the wellbore (e.g., a vibrator truck, air gun, and/or explosives). Traditionally, these measurements may be recorded by using a string of usually, approximately equally spaced geophones and/or hydrophones. By using such equipment, it is typically possible to sample the seismic wave field at resolutions on the order of tens of meters. However, the deployment of geophone strings for VSP is expensive and time consuming. For example, the geophone string needs to be inserted and retracted before and after each VSP data collection, which, in the case of a producing well, implies that production needs to be halted during collection.

An alternate method of collection VSP data may include the use of DAS techniques. In DAS VSP collection methods, the expensive geophone string is replaced by a fiber optic cable that may be, for example, cemented into the wellbore wall behind tubing or casing, or be temporarily placed in the well (e.g., inside a retrievable wireline logging cable) with the drill string in place or removed from the wellbore. As a consequence, DAS VSP data collection techniques may allow for wellbore seismic monitoring during operations such as stimulation and production without intervention. In addition, DAS VSP data collection techniques may allow for the collection of data samples of the seismic wave field at resolutions on the order of a few meters (as opposed to tens of meters with traditional geophones). Furthermore, DAS VSP data collection may occur over the entire well at one instant, as compared with geophones which are typically deployed in short arrays covering only parts of the well at any one time.

However, artifacts inherent to DAS data collection may be present in DAS VSP data, whereas the same artifacts may not be found in VSP data collected through the use of geophones. For example, one source of noise in the DAS VSP collection system includes the appearance of seemingly infinite velocity events which occur across all channels (i.e., depths in the wellbore) at the same time, of the recorded data. These artifacts may be from a DAS interrogator unit at the surface of the wellbore, and may be caused, for example, by the seismic source or other sound sources causing vibrations in the DAS interrogator as optical pulses are sent down the fiber optic cable. These may appear in DAS VSP data as horizontal noise events, as described further below. Other example sources of noise in the DAS VSP collection system include channel fading, near-wellhead noise, and/or cable termination noise. Each of these events may appear in DAS VSP data as vertical or near-vertical noise, as described further below.

Accordingly, aspects of the present disclosure include methods for reducing the noise inherent to data collected using DAS VSP techniques. In particular, the present disclosure may include methods for identifying and removing horizontal and/or vertical types of noise events seen in DAS VSP data sets. To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 8, where like numbers are used to indicate like and corresponding parts.

Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. Embodiments described below with respect to one implementation are not intended to be limiting.

Figure 1:
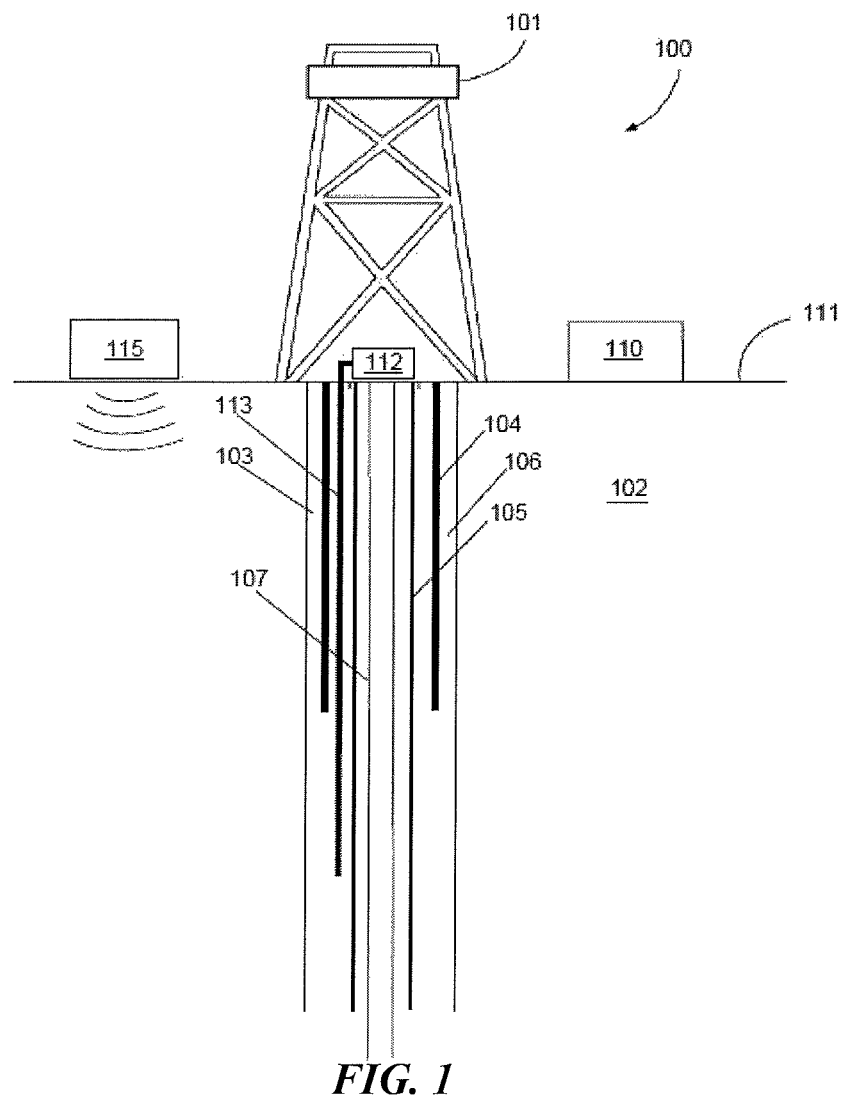
FIG. 1 illustrates an example completed well system incorporating a DAS system, in accordance with embodiments of the present disclosure.

FIG. 1 illustrates an example completed well system 100 incorporating a DAS system 112, in accordance with embodiments of the present disclosure. The system 100 includes a rig 101 located at a surface 111 and positioned above a wellbore 103 within a subterranean formation 102. One or more tubulars are positioned within the wellbore 103 in a telescopic fashion. As depicted, the tubulars comprise a surface casing 104 and a production casing 105. The surface casing 104 comprises the largest tubular and is secured in the wellbore 103 via a cement layer 106. The production casing 105 is at least partially positioned within the surface casing 104 and may be secured with respect to the formation 102 and the surface casing 104 via a casing hanger (not shown) and a cement layer. The system 100 further includes tubing 107 positioned within the production casing 105. Other configurations and orientations of tubulars within the wellbore 103 are possible.

As depicted, the system 100 includes DAS system 112 located at the surface 111. The DAS system 112 may be coupled to an optical fiber 113 that is at least partially positioned within the wellbore 103. As depicted, the fiber 113 is positioned between the surface casing 104 and the production casing 105. The fiber 113 may be secured in place between the surface casing 104 and the production casing 105 such that it functions as a "permanent" seismic sensor. In other embodiments, the fiber 113 may be secured to the tubing 107, for instance, lowered into the wellbore 103 through the inner bore of the tubing 107 in a removable wireline arrangement, or positioned at any other suitable position.

Although illustrated as including one DAS system 112 coupled to optical fiber 113, any suitable number of DAS systems (each coupled to a different optical fiber at least partially located downhole) may be placed adjacent to wellbore 103. With optical fiber 113 positioned inside a portion of wellbore 103, DAS system 112 may obtain seismic data based on disturbances caused by seismic source 115. Some examples of seismic sources may include explosives (e.g., dynamite), air guns, thumper trucks, or any other suitable vibration source for creating seismic waves in formation 102. As will be described in detail below, the seismic data may correspond to changes in strain in the optical fiber 113 that are identified by detecting phase changes in backscattered light signals along the length of optical fiber 113.

As depicted, the system 100 further includes an information handling system 110 positioned at the surface 111. The information handling system 110 may be communicably coupled to the DAS system 112 through, for instance, a wired or wireless connection. The information handling system 110 may receive measurement in the form of seismic data from the DAS system 112 and perform one or more actions that will be described in detail below. Additionally, the information handling system 110 may receive seismic data from a data center or storage server in which the seismic data from the DAS system 112 were previously stored.

Modifications, additions, or omissions may be made to FIG. 1 without departing from the scope of the present disclosure. For example, the DAS systems and optical fibers may be used during wireline or slickline logging operations before some or all of the tubulars have been secured within the wellbore, and/or before the wellbore 103 is completed. As another example, multiple seismic sources 115 may be used in conjunction with downhole drilling system 100 and DAS system 112. Moreover, components may be added to or removed from system 100 without departing from the scope of the present disclosure.

Figure 2:
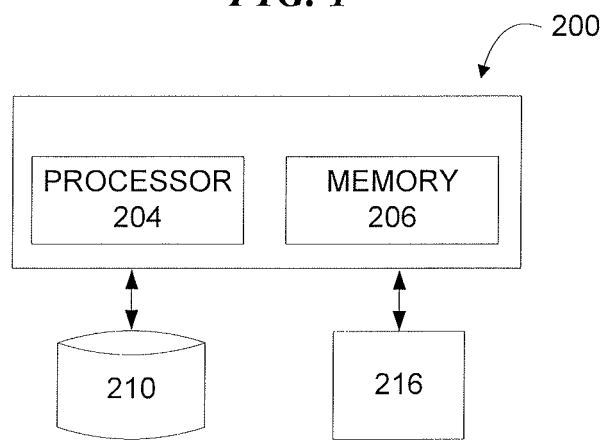
FIG. 2 illustrates a block diagram of an exemplary information handling system, in accordance with embodiments of the present disclosure.

FIG. 2 illustrates a block diagram of an exemplary information handling system 200, in accordance with embodiments of the present disclosure. The information handling system 200 may comprise or include similar functionality as the information handling system used with the completed well system described above. For instance, information handling system 200 may be configured to receive seismic data from a DAS system and perform one or more noise reduction methods that will be described in detail below. The information handling system 200 is not limited to the completed well system described above, however, and can be used with different drilling and logging systems, at positioned at different locations.

The information handling system 200 comprises a processor 204. Processor 204 may include, for example a microprocessor, microcontroller, digital signal processor (DSP), application specific integrated circuit (ASIC), or any other digital or analog circuitry configured to interpret and/or execute program instructions and/or process data. As depicted, the processor 204 is communicatively coupled to memory 206 and configured to interpret and/or execute program instructions or data retrieved and stored in memory 206. Program instructions or data may constitute portions of software 210 for carrying out methods of noise reduction, as described herein. Memory 206 may include any system, device, or apparatus configured to hold and/or house one or more memory modules; for example, memory 206 may include read-only memory, random access memory, solid state memory, or disk-based memory. Each memory module may include any system, device or apparatus configured to retain program instructions and/or data for a period of time (e.g., computer-readable non-transitory media). For example, instructions from software 210 may be retrieved and stored in memory 206 for execution by processor 204. In certain embodiments, the information handling system may further comprise one or more displays 216 or other input/output peripherals such that information processed by the information handling system 200 (e.g., seismic data from a DAS system) may be conveyed to operators of drilling and logging equipment.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Figure 3:
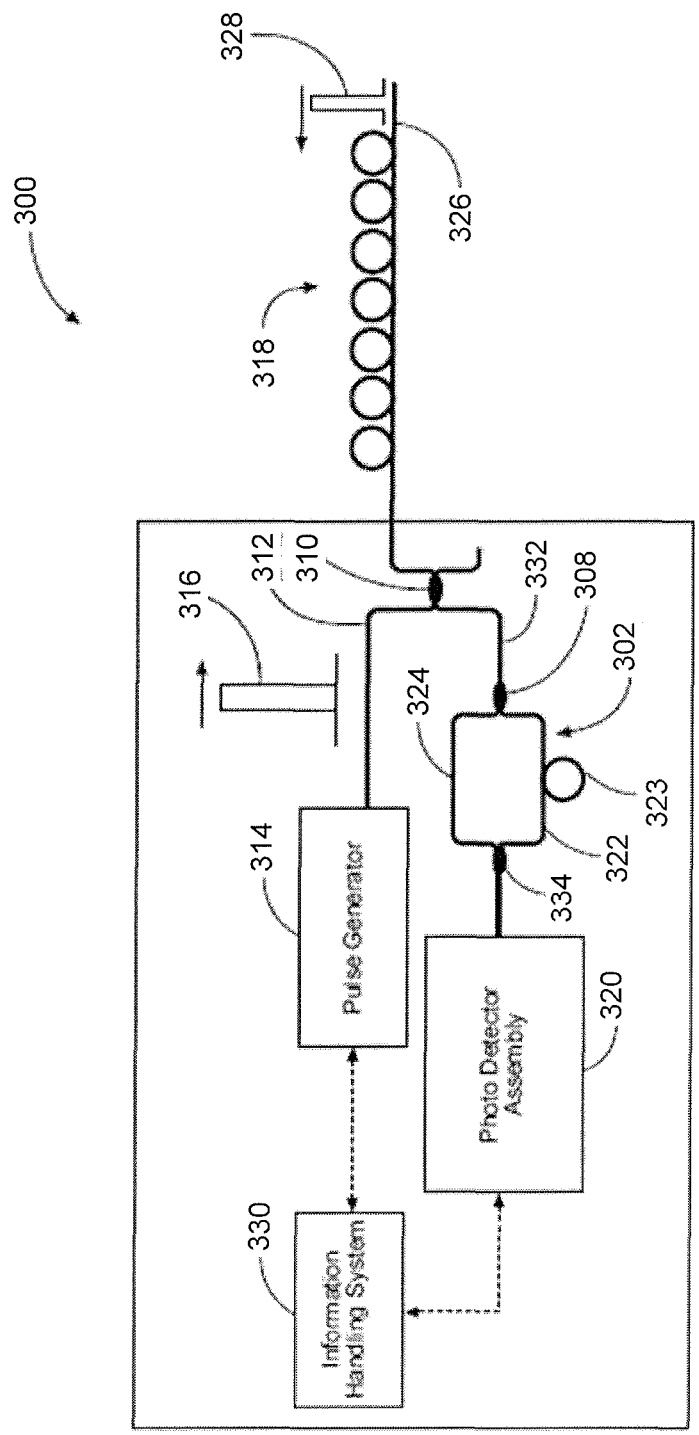
FIG. 3 illustrates an example system for performing DAS in accordance with particular embodiments of the present disclosure.

FIG. 3 illustrates an example DAS system 300 for performing DAS in accordance with particular embodiments of the present disclosure. The DAS system 300 may be incorporated into the completed well system described above with reference to FIG. 1, with an optical fiber 326 of the DAS system 300 at least partially positioned within a wellbore. The DAS system also may be incorporating into other drilling, logging, and completion systems that would be appreciated by one of ordinary skill in the art having the benefit of this disclosure. The DAS system 300 may comprise a single pulse coherent Rayleigh scattering system with a compensating interferometer but is not intended to be limited to such. In particular embodiments, DAS system 300 may be used for phase-based sensing of events in a wellbore using measurements of coherent Rayleigh backscatter or may interrogate a fiber optic line containing an array of partial reflectors, for example fiber Bragg gratings.

Referring to FIG. 3, the DAS system 300 may comprise a pulse generator 314 coupled to a first coupler 310 using the optical fiber 312. The pulse generator 314 may be a laser, or a laser connected to an amplitude modulator, or a laser connected to a switching amplifier i.e. semiconductor optical amplifier (SOA). The pulse generator 314 may be located at any suitable location when performing subterranean operations. For instance, in some embodiments, the pulse generator 314 may be located at the surface of the wellbore. The first coupler 310 may be a traditional fused type fiber optic splitter, a circulator, a PLC fiber optic splitter, or any other type of splitter known to those with ordinary skill in the art having the benefit of this disclosure. The pulse generator 314 may be coupled to optical gain elements (not shown) to amplify pulses generated therefrom. Example optical gain elements include, but are not limited to, Erbium Doped Fiber Amplifiers (EDFAs) or Semiconductor Optical Amplifiers (SOAs).

The DAS system 300 may comprise an interferometer 302. As depicted, the interferometer 302 comprises a Mach-Zehnder interferometer, but it is not intended to be limited to such. For instance, in certain implementations, a Michelson interferometer or any other type of interferometer known to those of skill in the art having the benefit of this disclosure may also be used without departing from the scope of the present disclosure. The interferometer 302 may comprise a top interferometer arm 324, a bottom interferometer arm 322, and a gauge 323 positioned on the bottom interferometer arm 322. The interferometer 302 may be coupled to the first coupler 310 through a second coupler 308 and an optical fiber 332. The interferometer 302 further may be coupled to a photodetector assembly 320 of the system 300 through a third couple 334 opposite the second coupler 308. The second coupler 308 and third coupler 334 may be a traditional fused type fiber optic splitter, a PLC fiber optic splitter, or any other type of splitter known to those with ordinary skill in the art having the benefit of this disclosure. The photodetector assembly 320 may include associated optics and signal processing electronics (not shown). The photodetector assembly 320 may be a semiconductor electronic device that uses the photoelectric effect to convert light to electricity. The photodetector assembly 320 may be an avalanche photodiode or a pin photodiode but is not intended to be limited to such.

In operation of the system 300, the pulse generator 314 may generate a first optical pulse 316 which is transmitted through the optical fiber 312 to the first coupler 310. The first coupler 310 may direct the first optical pulse 316 through the optical fiber 326, which may be coupled to the first coupler 310. Although a linear deployment for the fiber cable is typical, different geometries may be used. For example, at least a portion of the optical fiber 326 may be arranged in coils 318. As the first optical pulse 316 travels through the optical fiber 326, imperfections in the optical fiber 326 may cause a portion of the light to be backscattered along the optical fiber 326 due to Rayleigh scattering. Scattered light according to Rayleigh scattering is returned from every point along the optical fiber 326 along the length of the optical fiber 326 and is shown as backscattered light 328 in FIG. 3. This backscatter effect may be referred to as Rayleigh backscatter. Density fluctuations in the optical fiber 326 may give rise to energy loss due to the scattered light, with the following coefficient:

$$\alpha_{scat} = \frac{8\pi^3}{3\lambda^4} n^8 p^2 k T_f \beta$$

where n is the refraction index, p is the photoelastic coefficient of the optical fiber 326, k is the Boltzmann constant, and β is the isothermal compressibility. $T_f$ is a fictive temperature, representing the temperature at which the density fluctuations are "frozen" in the material. The optical fiber 326 may be terminated with a low reflection device (not shown). In certain implementations, the low reflection device (not shown) may be a fiber coiled and tightly bent to violate Snell's law of total internal reflection such that all the remaining energy is sent out of the fiber. In other implementations, the low reflection device (not shown) may be an angle cleaved fiber. In still other implementations, the low reflection device (not shown) may be a coreless optical fiber with high optical attenuation. In still other implementations, the low reflection device (not shown) may be a termination, such as the AFL Endlight.

The backscattered light 328 may travel back through the optical fiber 326, until it reaches the second coupler 308. The first coupler 310 may be coupled to the second coupler 308 on one side by the optical fiber 332 such that the backscattered light 328 may pass from the first coupler 310 to the second coupler 208 through the optical fiber 332. The second coupler 308 may split the backscattered light 328 based on the number of interferometer arms so that one portion of any backscattered light 328 passing through the interferometer 302 travels through the top interferometer arm 324 and another portion travels through the bottom interferometer arm 322. In other words, the second coupler 308 may split the backscattered light from the optical fiber 332 into a first backscattered pulse and a second backscattered pulse. The first backscattered pulse may be sent into the top interferometer arm 322. The second backscattered pulse may be sent into the bottom interferometer arm 324. These two portions may be re-combined at the third coupler 334, after they have exited the interferometer 302, to form an interferometric signal.

The interferometer 302 may facilitate the generation of the interferometric signal through the relative phase shift variations between the light pulses in the top interferometer arm 324 and the bottom interferometer arm 322. Specifically, the gauge 323 may cause the length of bottom interferometer arm 322 to be longer than the length of top interferometer arm 324. With different lengths between the two arms of interferometer 302, the interferometric signal may include backscattered light from two positions along the fiber 326 such that a phase shift of backscattered light between the two different points along the fiber 326 can be identified in the interferometric signal. The distance between those points L may be half the length of the gauge 323 in the case of a Mach-Zehnder configuration, or equal to the gauge length in a Michelson interferometer configuration.

While the system 300 is running, the interferometric signal will typically vary over time. The variations in the interferometric signal may identify strains in the optical fiber 326 that are caused, for example, by seismic/acoustic energy. By using the time of flight for the optical pulse 316, the location of the strain along the optical fiber 316 and the time at which it occurred can be determined. If the optical fiber 326 is positioned within a wellbore, the locations of the strains in the fiber 326 can be correlated with depths in the formation in order to associate the seismic/acoustic energy with locations in the formation and wellbore.

To facilitate the identification of strains in the optical fiber 326, the interferometric signal may reach the photodetector assembly 320, where it may be converted to an electrical signal. The photodetector assembly may provide an electric signal proportional to the square of the sum of the two electric fields from the two arms of the interferometer. This signal is proportional to $P(t)=P_1+P_2+2*Sqrt(P_1P_2)cos(\phi_1-\phi_2)$ where $P_n$ is the power incident to the photodetector from a particular arm (1 or 2) and $\phi_n$ is the phase of the light from the particular arm of the interferometer. The photodetector assembly 320 may transmit the electrical signal to the information handling system 330, which may process the electrical signal to identify strains within the fiber 326 and/or convey the data to a display and/or store it in computer-readable media. The photodetector assembly 320 and information handling system 330 may be communicatively and/or mechanically coupled. A first device may be communicatively coupled to a second device if it is connected to the second device through a wired or wireless communication network which permits the transmission of information. Thus, the information handling system 330 may be located uphole, downhole, or at a remote location. The information handling system 330 may also be communicatively or mechanically coupled to the pulse generator 314.

Modifications, additions, or omissions may be made to FIG. 3 without departing from the scope of the present disclosure. For example, FIG. 3 shows a particular configuration of components of system 300. However, any suitable configurations of components may be used. For example, a compensating interferometer may be placed in the launch path (i.e. prior to traveling down optical fiber 326) of the interrogating pulse to generate a pair of pulses that travel down optical fiber 326. In such embodiments, an interferometer may not be necessary to interfere the backscattered light from pulses prior to being sent to photo detector assembly. In one branch of the compensation interferometer in the launch path of the interrogating pulse, an extra length of fiber not present in the other branch (a gauge length similar to gauge 323 of FIG. 3) is used to delay one of the pulses. To accommodate phase detection of backscattered light using system 300, one of the two branches may include an optical frequency shifter (for example, an acousto-optic modulator) to shift the optical frequency of one of the pulses, while the other may include a gauge. This may allow using a single photodetector receiving the backscatter light to determine the relative phase of the backscatter light between two locations by examining the heterodyne beat signal received from the mixing of the light from different optical frequencies of the two interrogation pulses.

As another example, system 300 may generate interferometric signals for analysis by information handling system 330 without the use of a physical interferometer. For instance, system 300 may direct backscattered light to photo detector assembly 320 without first passing it through any interferometer, such as interferometer 302 of FIG. 3. Alternatively, the backscattered light from the interrogation pulse may be mixed with the light from the laser originally providing the interrogation pulse. Thus, the light from the laser, the interrogation pulse, and the backscattered signal may all be collected by photodetector 320 and then analyzed by information handling system 330. The light from each of these sources may be at the same optical frequency in a homodyne phase demodulation system, or may be different optical frequencies in a heterodyne phase demodulator. This method of mixing the backscattered light with a local oscillator allows measuring the phase of the backscattered light along the fiber relative to a reference light source. Using this method, the gauge length can be assigned in software after data has been recorded by subtracting the measured phase from any two locations along the fiber and tracking this phase difference between the two locations over time to obtain an acoustic signal recorded by the fiber between the two selected locations. Accordingly, in either embodiment, instructions embodied in computer-readable medium of information handling system 330 may be used to compare data from two backscattered light signals received at different times, essentially replicating the function of interferometer 302 in system 300 of FIG. 3.

Furthermore, in particular embodiments, a continuously modulated interrogation signal may be emitted into the fiber instead of a pulse (e.g., pulse 316). For example a phase, frequency, or amplitude modulator following the laser may be used instead of a pulse generator (such as pulse generator 314) to send a coded or spread-spectrum interrogation signals down optical fiber 326 to allow distributed acoustic sensing using information handling system 330.

As described above, DAS may be used as a method for collecting seismic data of a formation. In particular embodiments, the collected seismic data using DAS techniques may be VSP data. To collect DAS VSP data, a vibration source at the surface of a wellbore may generate sound waves through the formation. Some examples of vibration sources may include explosives (e.g., dynamite), air guns, thumper trucks, or any other suitable vibration source for VSP data collection. These sound waves in the formation may cause strain changes in the fiber optic cable of the DAS system, and these strain changes may be measured using DAS systems like those described above. In particular, the DAS system may send optical pulses down the fiber optic cable at a particular rate, portions of which may reflect back toward the optical pulse source at various lengths in the cable, as described above. These reflections may be measured at various times over finite time durations (which may coincide with the rate and duration of the optical pulse generation) to measure strain changes in the fiber optic cable at various depths.

Each measurement captured by the DAS system may be referred to as a "sweep." Although the measurements described above are generated using a vibrator as the seismic source, measurements and "sweeps" may refer to data collected from any single source being energized. Characteristics of the sound waves (e.g., amplitude and duration) received at the fiber, which may be referred to as acoustic activity, may be determined based, at least in part, on the measured strain changes. One sweep may comprise seismic data in the form of acoustic activity for all DAS measured depths along the wellbore over the finite time duration. The seismic data within a sweep may be de-multiplexed to generate traces (or channels) of the seismic data at the various data collection depths. The traces may indicate the seismic data at a particular depth in the wellbore over the time duration of the sweep. Using the information from one or more sweeps, properties of the formation may be determined. For example, the speed of a formation (i.e., the speed of sound in the formation) may be determined. As another example, the seismic data may be used to form underground images.

The DAS data collection method described above may be a more efficient way of collecting the seismic data when compared with using traditional geophones to collect the same information. Data collection using geophones may require substantial time and physical effort as compared with the DAS method previously described. For example, geophones may need to be physically raised and/or lowered for every depth sample (channel) of seismic data collected, which may take minutes or hours to perform. In contrast, using DAS techniques as described, data for all depths may be collected by sending optical pulses every few milliseconds for a few seconds down a fiber optic cable in a wellbore (without the need to raise or lower the fiber optic cable). However, artifacts inherent to DAS data collection may be present in seismic data collected according to the above methods, as discussed below with respect to FIG. 4, while the same artifacts may not be found in seismic data collected through the use of geophones.

Figure 4:
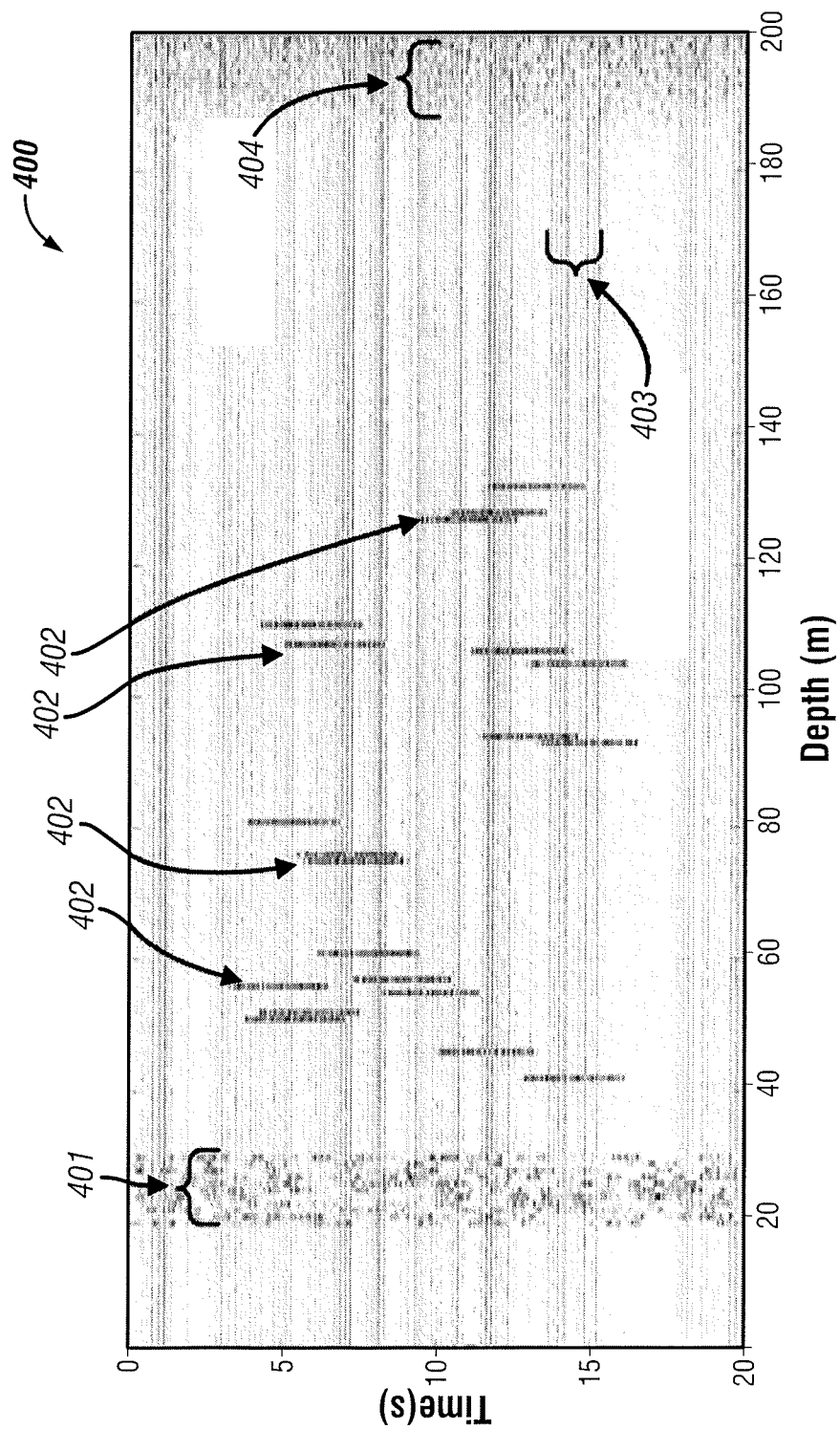
FIG. 4 illustrates an example DAS VSP data set with noise in accordance with particular embodiments of the present disclosure.

FIG. 4 illustrates an example DAS VSP data set 400 with noise in accordance with particular embodiments of the present disclosure. The DAS VSP data set 400 comprises synthetic data representative of DAS VSP data that may be generated using the DAS system and completed well system described above, or other DAS VSP collection techniques within the scope of this disclosure. The DAS VSP data set 400 may include a number of seismic traces, with each seismic trace being associated with a channel, or depth, in the wellbore. As depicted, the DAS VSP data set 400 may comprise a single sweep, or multiple sweeps that were "stacked" together, as will be described below. Each trace may include acoustic (magnitude) activity acquired over time in response to acoustic/seismic signals propagated through the formation.

As depicted the DAS VSP data set comprises "vertical" and "horizontal" noise events. "Vertical" noise events may refer to noise that appears as vertical streaks in DAS VSP data, as shown in FIG. 4. These types of noise events may affect (almost arbitrarily) individual channels (effective receivers along the fiber) for elongated periods of time, and may typically be caused by channel fading (which may be caused by polarization fading (due to polarization drifts in the light before and after it traverses the cable), or Rayleigh fading (due to the destructive interference of optical signals scattered by a multitude of scattering sites lying within the coherence length of the transmitted light pulse)), environmental noise near the wellhead (e.g., from wind noise on the fiber optic cable, worker activity at the surface of the wellbore, or trucks in motion on the surface of the wellbore), or cable termination noise (which causes a large number of channels close to the tail of the fiber-optic cable to be unusable). Example vertical noise events can be seen in FIG. 4 with regard to near-wellhead noise 401, channel fading 402, and cable termination noise 404. It will be understood that even though vertical noise events are not "stationary" (i.e., only affect one channel/depth), they may typically dominate most parts of particular DAS channels such that those channels can be discarded from further VSP DAS processing.

"Horizontal" noise events may refer to seemingly infinite velocity events that appear to be common across all sensing locations along the fiber. These events may be seen in FIG. 4 as horizontal streaks. These events are typically caused by acoustic or vibration energy impinging on a DAS interrogation box at the surface of a wellbore and may induce a phase change on all DAS sensing channels simultaneously such that noise appears at a particular time across all depths/channels. Example horizontal noise events can be seen in FIG. 4 with regard to infinite velocity noise 403, where horizontal lines appear in the data. In some embodiments, in conjunction with the methods described below, the problem of horizontal noise events may be addressed by utilizing an acoustic reference coil that is used to measure and identify environmental-type noise incident upon the measurement fiber optic cable that is lowered downhole. Once determined through the use of the reference cable, the noise may be subtracted from the recorded DAS VSP data.

Figure 5A:
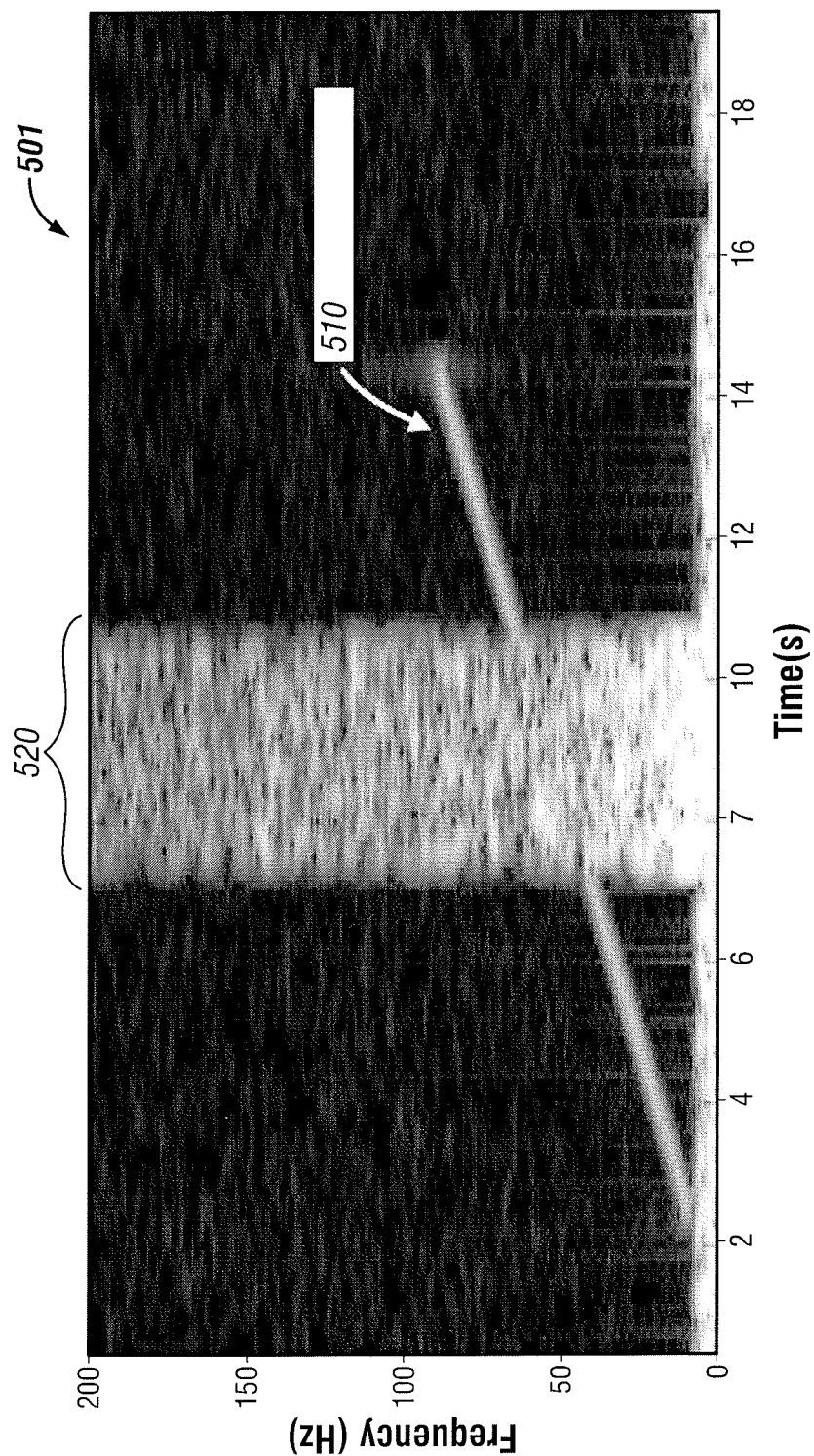
FIGS. 5A-5C illustrate example short-time Fourier transforms of channels within DAS VSP data set in accordance with embodiments of the present disclosure.
Figure 5B:
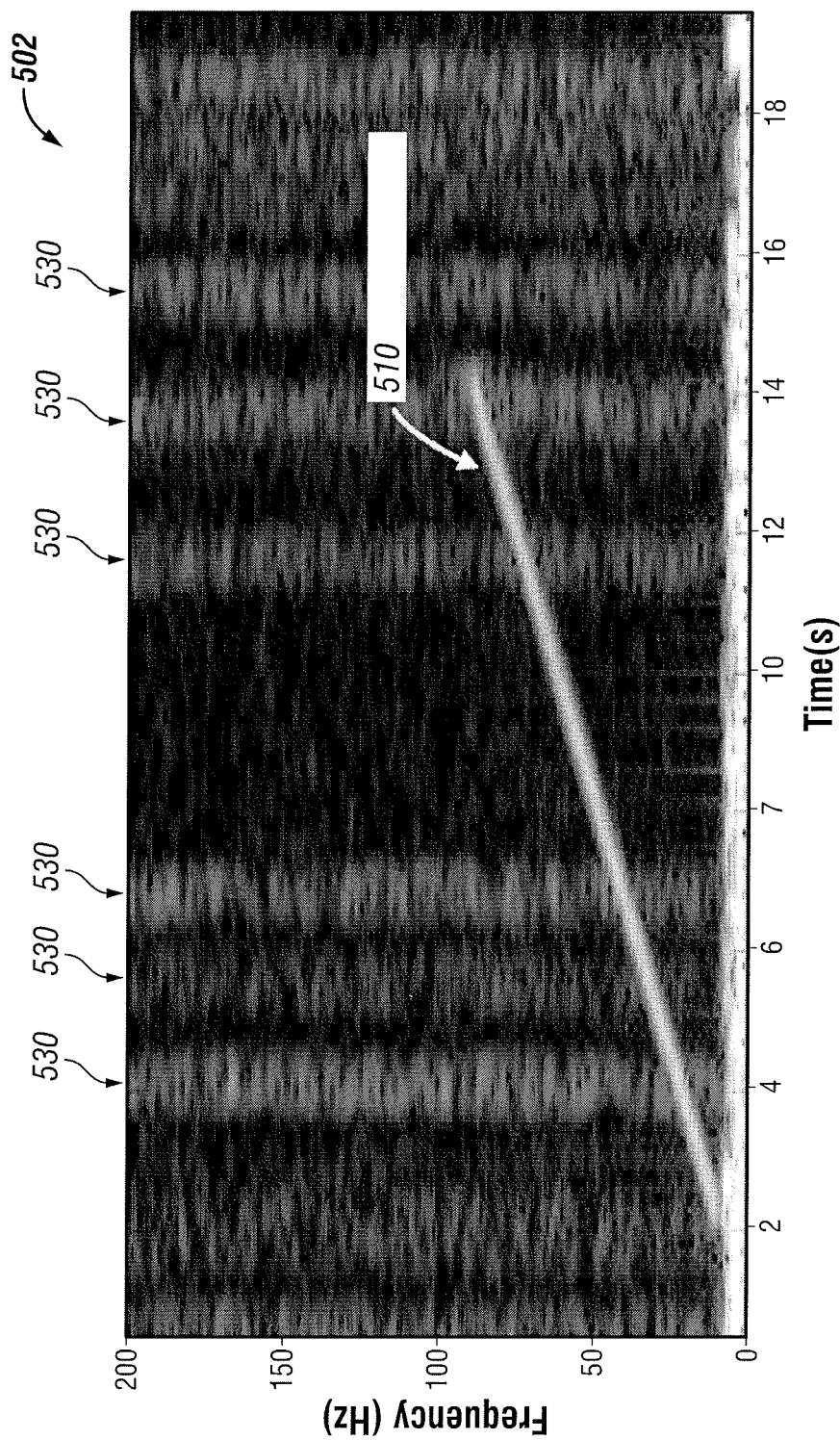
Figure 5C:
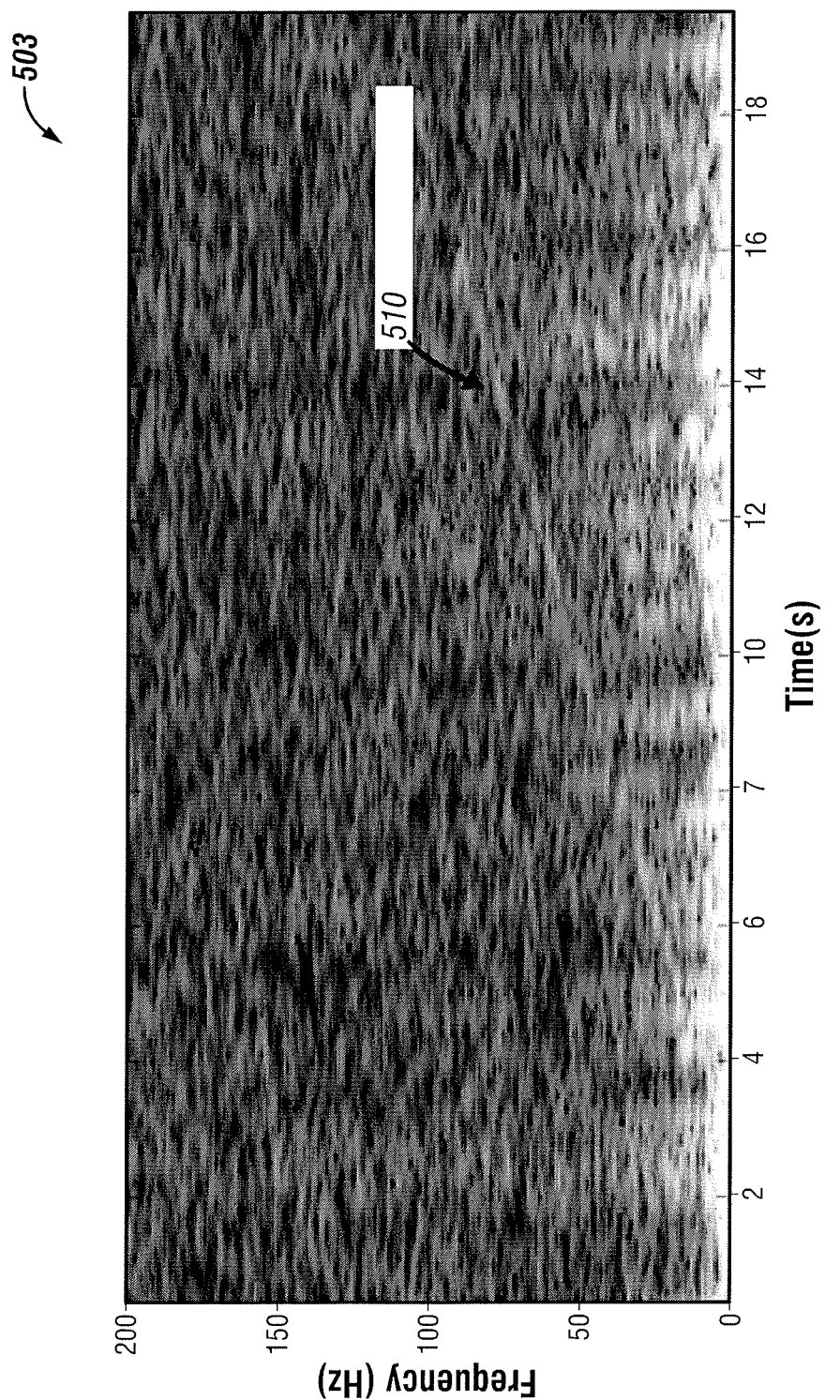

In certain embodiments, corrupted or low-quality channels or traces that contain unwanted noise may be identified by using an objective quality-control metric that is based on the acoustic activity as a function of time and frequency contained in each trace. To determine the acoustic activity as a function of time, in some embodiments, an operation for transforming the channel data into the frequency-time domain (e.g., short-time Fourier transform) may be used. FIGS. 5A-5C illustrate example short-time Fourier transforms of channels 501-503 within DAS VSP data set 400 in accordance with embodiments of the present disclosure. Although illustrated as short-time Fourier transforms of the channels, any suitable operation for transforming the channel data into the frequency-time domain may be used. Examples of other such operations may include the wavelet transform, variations of the periodogram method including Welch's method, the MUSIC and Eigenvector analysis methods. Channels 501-503 of FIGS. 5A-5C illustrate how the channels are affected by channel fading 520, near-wellhead noise 530, and cable termination noise (most of the data in channel 503), respectively.

As depicted in FIGS. 5A-5C, each noise source exhibits a unique signature in the time-frequency domain. In more detail, channel fading events 520 in channel 501 is characterized by an abrupt energy gain at lower frequencies, whereas the near wellhead noise events 530 (as well as other environmental noise events) in channel 502 appear to cause a sudden but less severe increase of acoustic activity across the entire frequency spectrum. Moreover, near-wellhead noise events 530 are an additive noise source and therefore less critical than channel fading events 520, which may eradicate any seismic activity present in the DAS VSP data channel. Cable termination noise in channel 503, on the other hand, is characterized by an increase of the overall acoustic activity along both time and frequency contained in the channel. In FIGS. 5A-5C, these effects are illustrated by the change of the overall grayscale tone from dark (approximately −50 dB) to bright (approximately −20 dB). As a consequence, the vibrator sweep 510 depicted in the FIGS. 5A and 5B as the dipping event starting at 9 HZ and ending at 90 HZ may be poorly visible in FIG. 5C.

Figure 6:
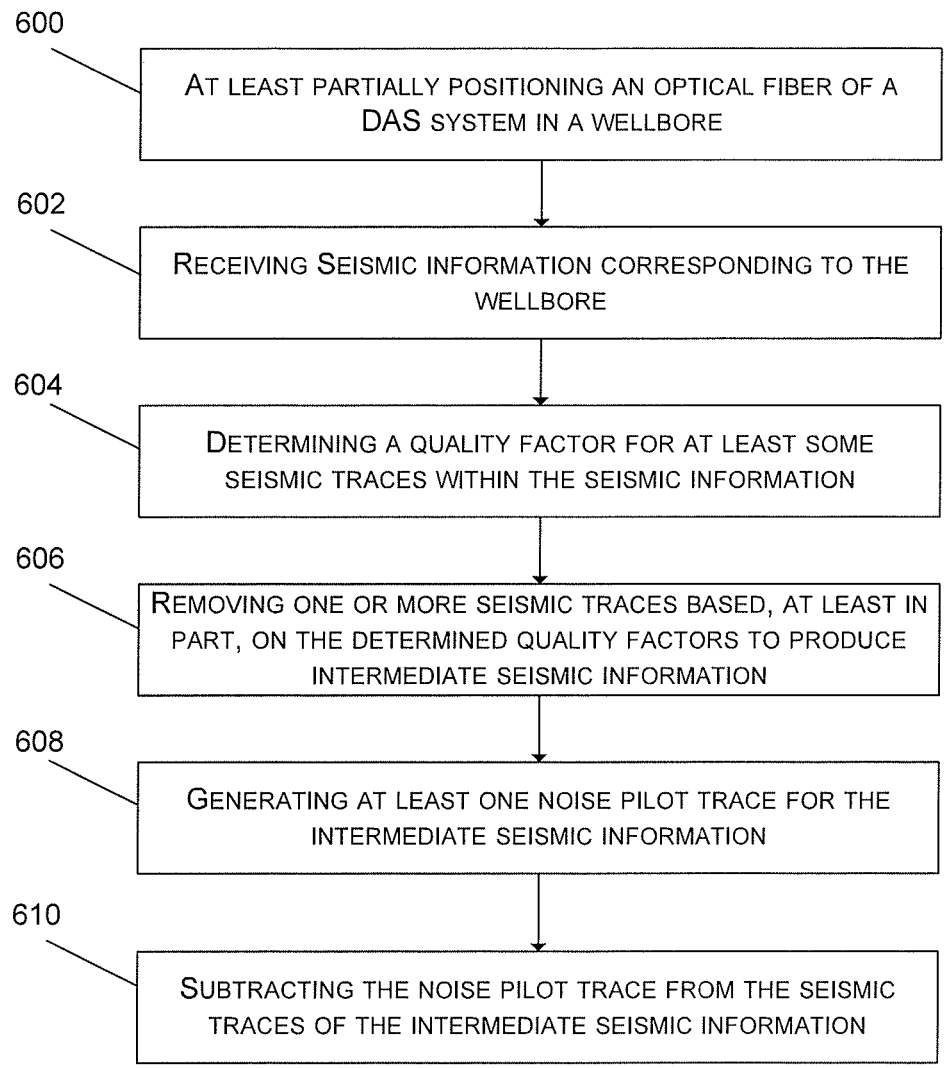
FIG. 6 illustrates an example process for identifying and removing noise events in DAS VSP data in accordance with embodiments of the present disclosure.

FIG. 6 illustrates an example process for identifying and removing noise events in DAS VSP data in accordance with embodiments of the present disclosure. Step 600 may comprise at least partially positioning an optical fiber of a DAS system within a wellbore. Example configurations in which optical fibers are positioned within wellbores are discussed above. Step 602 may comprise receiving seismic data corresponding to the wellbore from the DAS system. The seismic data may comprise VSP data corresponding to the wellbore, formation, or tools within the wellbore. The VSP data may comprise a plurality of seismic traces, with each seismic trace associated with a depth in the wellbore. The VSP data may comprise data from one or more sweeps. For instance, where the VSP data is generated with a vibrator as a seismic source, the VSP data may comprise a plurality of sweeps that identify seismic data for the span of time corresponding to the time that the vibration source is engaged. In contrast, where the VSP data is generated with an explosive source that emits seismic/acoustic energy over a smaller time duration, the VSP data may comprise only one sweep.

Step 604 may comprise determining a quality factor for at least some of the seismic traces within the received seismic data. The quality factor may aid in the identification of noisy channels (relatively to other channels) within the seismic data. An example quality factor may be determined by comparing the acoustic activity of each channel at each time instant to a reference value corresponding to the desired acoustic activity in the absence of noise or to other neighboring or nearby channels. For example, the quality factor may be determined by dividing the measured acoustic activity by the reference acoustic activity (resulting in a number between 0 and 1) in some embodiments. Another example quality factor may be calculated using a Signal-to-Noise Ratio, or comparing the measured acoustic activity to a pre-determined threshold with reference to the energy emitted by a seismic source.

In certain embodiment, the quality factor may be determined by calculating a mean or median acoustic activity of each channel and then comparing the mean or median acoustic activity of the channel to the mean or median acoustic energies of neighboring channels to determine whether the channel has abnormally high levels of noise. Any suitable number of neighboring or nearby channels may be used in the comparison. Those channels with abnormally high acoustic energies may have high or low quality factors (depending on the method of determination), Any other suitable form of calculating a quality factor may be used instead of or in conjunction with these methods. Once calculated, the quality factor information can be stored in one or more header fields with the VSP data set. For instance, the quality factor for each trace may be stored as a header for that trace, or the quality factors may be stored sequentially in a header associated with all of the VSP data set.

The quality factor also may be determined based on a frequency-domain response of the channel. In such embodiments, each channel of the DAS VSP data may be transformed to the time-frequency domain by means of, for example, the Short-Time Fourier Transform, Wavelet Transform, or any other suitable transform that exhibits a time-frequency resolution. The result of this will produce data for each channel similar to the plots shown in FIGS. 5A-5C. Once in the time-frequency domain, the quality factor may be determined, for example, based, at least in part, on the acoustic noise activity in the channel rather than the amount of overall acoustic activity. In certain embodiments, the noise activity may be associated with frequencies outside of the bandwidth of the seismic source. The quality factor calculation may include computing the mean acoustic activity in the determined noise spectrum (i.e, the frequencies outside of the range of the seismic source), median acoustic activity in the determined noise spectrum, acoustic activity standard deviation in the determined noise spectrum, or any other metric deemed suitable to measure acoustic activity in the determined noise spectrum. Using the example shown in FIGS. 5A-5C, energy appearing outside of the bandwidth of the vibrator sweep, which ranges from approximately 9-90 Hz, may be considered to be noise and may be the sole frequency ranges looked at to determine the quality factor.

The quality factor may also be determined with reference to the optical energy of the backscattered light containing the seismic data associated with the trace. For instance, in a phase sensitive DAS system, seismic data may comprise sinusoidal signals associated with DAS sensors or channels that represent the differences in the optical phase of the backscattered light between two locations on the fiber that form the spatial bounds of a particular DAS sensing region. The seismic data may be demodulated by determining the quadrature (Q) and in-phase (I) components of the optical signal. The quadrature component may represent the sine of the phase of the optical wave backscattered from a particular location and the in-phase component may represent the cosine of the phase of the optical wave backscattered from the same location when the backscattered light is mixed with light from a reference light source or local oscillator. The I and Q values also may respectively represent the cosine and sine of the phase difference between the backscattered light from two different locations obtained by performing optical interferometry by mixing the light backscattered from the two locations with each other before detection with an optical receiver. Alternatively, the I and Q values may be obtained directly. For instance, in a homodyne system, the I and Q values may be provided directly by photodiodes; and in a heterodyne system, the I and Q values may be obtained after the signal from the photodiode is mixed to baseband with an RF carrier, or obtained by performing the mixing stage in software. The optical energy of the backscattered light may be obtained by calculating the sum of the squared I and Q terms. Larger optical energy values may indicate a low degree of noise in the signal whereas smaller optical energy values may indicate a strong noise contamination. A quality factor associated with this noise indication may be assigned to the corresponding channel or trace.

Once calculated, the quality factor information can be stored in one or more header fields with the seismic data. For instance, the quality factor for each trace may be stored as a header for that trace, or the quality factors may be stored sequentially in a header associated with all of the seismic data.

At step 606, one or more seismic traces of the seismic data may be removed based, at least in part, on the determined quality factors to produce intermediate seismic data. For instance, the quality factors may be used to determine which of the channels or traces within the seismic data are low-quality channels. Once identified, the low-quality channels may be marked for later processing or removal, or may be removed from the data set prior to storage.

In particular embodiments, only the noisy portions of the channel data may be determined and identified as being low-quality, rather than the entire channel as described above. In such embodiments, a quality factor may be determined for each time instant of the channel data. This may include determining the overall energy at the time instant, or the energy at various frequencies during the time instant (e.g., the frequencies outside of the bandwidth of the acoustic source). The quality factor calculated at each time instant may then be compared to the factor calculated at the other time instants on the channel, and those time instants with abnormally high acoustic activity may thus be identified as low-quality. Once identified, the low-quality time instants of the channel may be marked for later processing or removal, or may be removed from the data set prior to storage. This may allow for the specific removal of noise on a channel rather than removal of the entire channel during processing, which may be particularly helpful in certain situations such as, for example, where the seismic source is an impulse source (i.e., the seismic/acoustic energy sent into the formation is in the form of an impulse, such as with an explosion or air gun seismic source).

Steps 604-606 may be used primarily to remove vertical noise events from the seismic data. Where only vertical noise is to be removed, the process may stop after step 606. In contrast, steps 608-610, described below, may be used primarily to remove horizontal noise events from the seismic data. The process for removing horizontal noise events may be similar to the one for vertical noise removal in that it is similarly based on the calculation of an acoustic activity metric (e.g., a quality factor) in the time/frequency domain. Notably, removal of horizontal noise events may take place after the vertical noise events are removed, as is depicted in FIG. 6, but may also take place before the vertical noise events are removed or without the vertical noise events being removed.

Step 608 comprises generating at least one noise pilot trace for the intermediate seismic data. Where the horizontal noise events are being removed before or without removing the vertical noise events, the at least one noise pilot trace may be generated from the raw seismic data received from the DAS system before or after correlation with a reference sweep signal. Moreover, horizontal noise removal may be performed on each sweep individually or on multiple sweeps that were "stacked" together. In certain embodiments, the noise pilot trace may be created by stacking selected channel traces together, such as through mean stacking or median stacking, or through weighted approaches to those stacking techniques (e.g., weighting particular channels/traces more heavily than others prior to determining a mean). The channels may be selected, for instance, using one or more quality factors described above. In certain embodiments, the noise pilot trace may be determined by calculating an average acoustic activity value across the selected channels/traces for each sweep and then "stacking" the determined average acoustic activity values for the sweeps to produce the noise pilot trace. The averaging process may include using the mean of the traces, the median of the traces, or a combination thereof. In some embodiments, a weighting term can be applied to each of the selected traces. The average process can then consist of forming the mean or median of each of these weighted samples. Whatever averaging process is used, it may be repeated for each sample of the noise pilot trace.

In some embodiments, the noise pilot trace may be determined using only those channels with low acoustic activity (i.e., not low-quality channels). The determination of whether a channel is low-quality may be done as described above with respect to the vertical noise removal process. That is, a quality factor may be determined for each channel (through one or more comparisons with other channels, reference levels, thresholds, or any other suitable comparison point) to determine whether the channel contains a large amount of noise. Once the high-quality, low-noise channels are determined through one or more of the methods described above, those channels may be used in the creation of the noise pilot trace as described above.

The determination of the higher quality channels may include the same steps as in the vertical noise removal process, or may include separate steps distinct from the steps in the vertical noise removal process. For example, where the vertical noise removal occurs before horizontal noise removal, the same quality factors determined in the vertical noise removal process may be used for the noise pilot trace creation in the horizontal noise removal process. However, different quality factors (e.g., with different methodologies) from those used in the vertical noise removal process may also be calculated for determination of channel quality during the horizontal noise removal process.

Once the noise pilot trace is determined and created, it may include data with enhanced channel-to-channel horizontal, infinite velocity noise signals (because the infinite velocity noise signals do not change from trace to trace) and greatly reduced desired signals (because the desired signals are changing from trace to trace). At step 610, the noise pilot trace can then be used as an estimate of the infinite velocity noise signal, and may therefore be subtracted from the DAS VSP data to give a more accurate representation of the desired signal with reduced noise. In some embodiments, the subtraction may be a weighted subtraction, whereby particular traces of the noise pilot trace are given weights prior to subtraction. In certain embodiments, the subtraction may be performed by an adaptive manner, i.e., by applying a multiplicative scalar to the noise pilot trace in order to best match the amplitude of the noise before subtraction. After the noise pilot trace is subtracted from the DAS VSP traces, the infinite velocity noise will be removed or at least highly attenuated, and the data may be better suited for further. VSP data analysis.

Figure 7A:
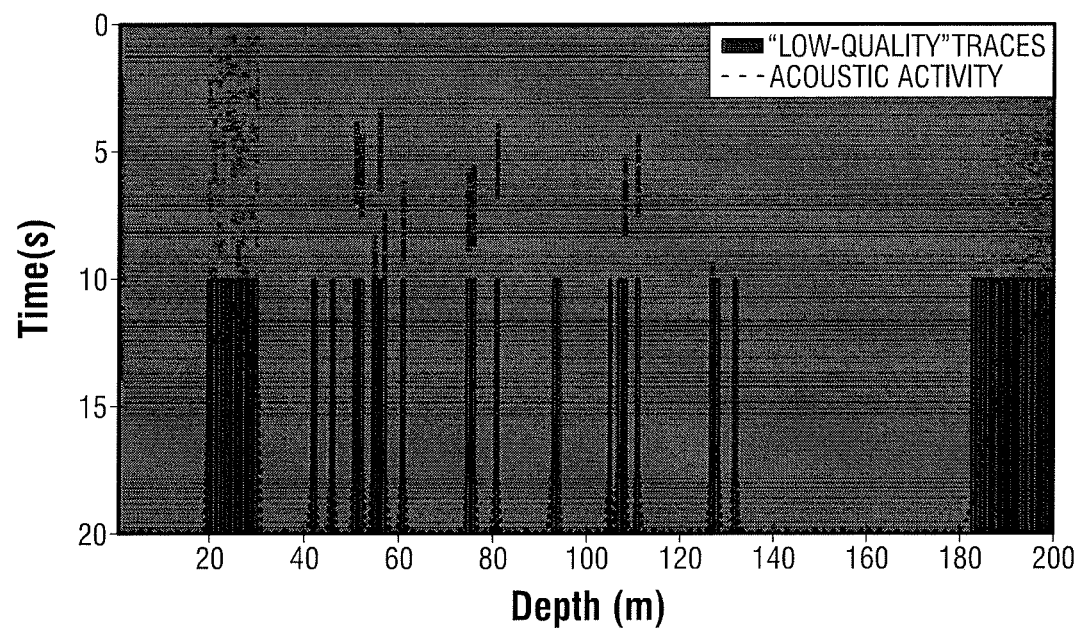
FIGS. 7A-7B illustrate an example process for identifying and removing vertical noise events in DAS VSP data set in accordance with embodiments of the present disclosure.
Figure 7B:
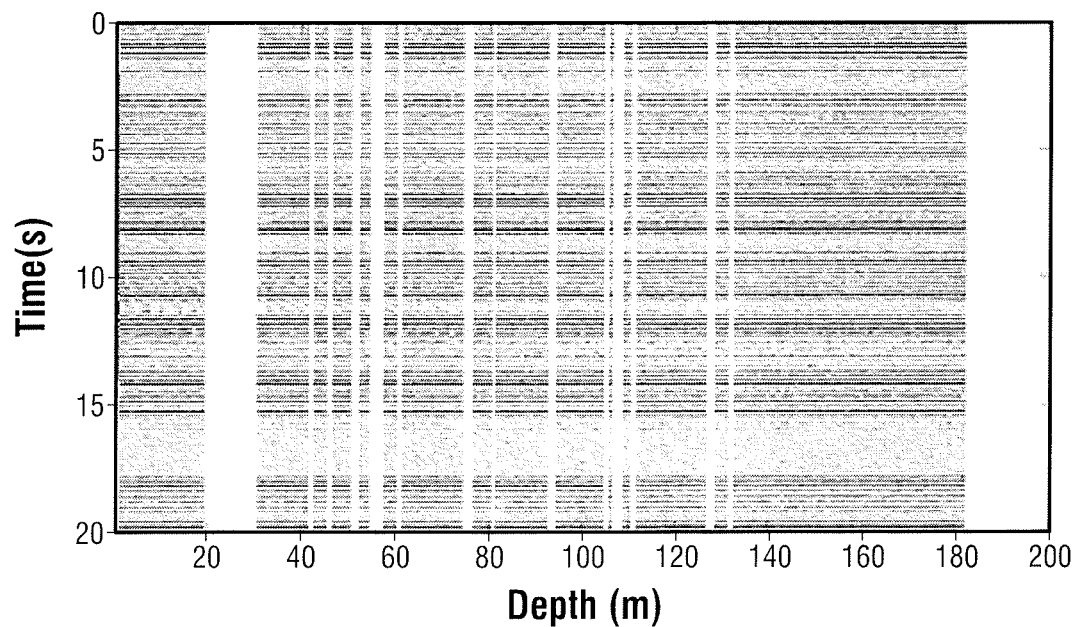

The results of applying the steps to remove vertical noise events described above to the DAS VSP data set 400 of FIG. 4 can be seen in FIGS. 7A-7B. In particular, FIG. 7A illustrates DAS VSP data set 400 with the determined acoustic activity for each channel depicted on top of DAS VSP data set 400 (with the low-quality traces accordingly identified), while FIG. 7B illustrates the intermediate DAS VSP data set 400 with the identified low-quality traces removed (which may be done prior to or after storage). It will be understood that low-quality traces may be determined using a threshold scheme for the determined quality factors, in some embodiments. By following this methodology, all low-quality channels/traces may be successfully identified and removed from the raw DAS VSP data set 400 either prior to or after storage.

Figure 8A:
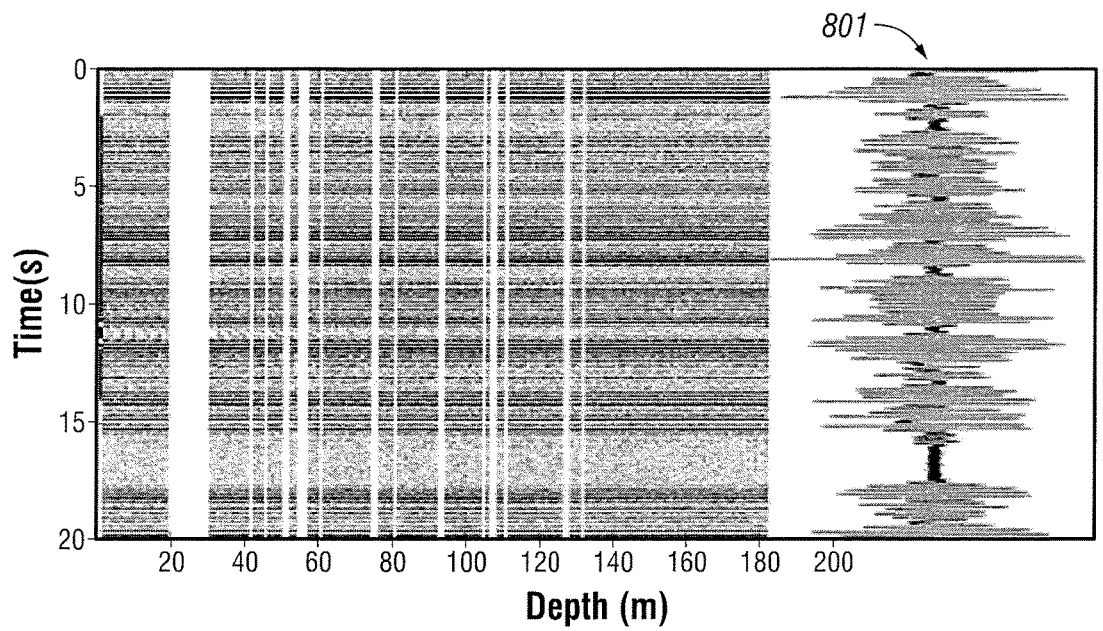
FIGS. 8A-8B illustrate an example process for identifying and removing horizontal noise events in DAS VSP data set in accordance with embodiments of the present disclosure.
Figure 8B:
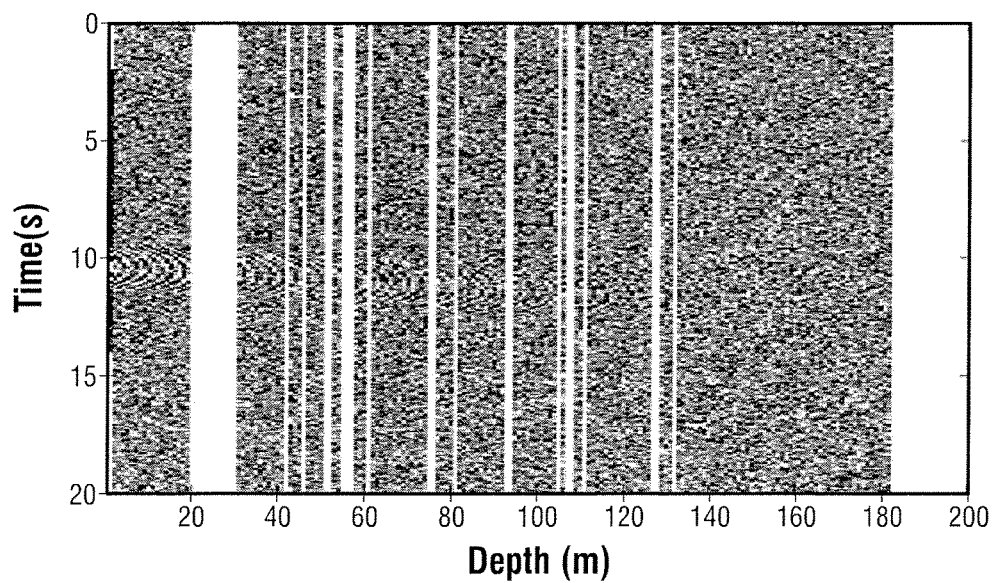

The results of applying the steps to remove horizontal noise events described above to the intermediate data set illustrated in FIG. 7B can be seen in FIGS. 8A-8B. Specifically, FIG. 8A illustrates an example noise pilot trace 801 that corresponds to the horizontal noise signals identified at each time within the intermediate seismic data. FIG. 8B depicts the intermediate seismic data after the noise pilot trace is subtracted from each trace within the intermediate seismic data.

FIGS. 9A-9B illustrate an example DAS VSP data set before and after applying noise reduction techniques in accordance with embodiments of the present disclosure. In particular, FIG. 9A illustrates the result of correlating the synthetic DAS VSP data set 400 of FIG. 4 with a synthetic reference sweep signal before and after noise removal. As shown in FIG. 9B when compared with FIG. 9A, the present disclosure is well suited to produce VSP data plots that are free from the previously identified vertical and horizontal noise sources, and data that exhibits a significantly higher quality than the original DAS VSP data set without noise removal.

In certain embodiments, a stacking approach may be used alone or in addition to the process described in FIG. 6 to remove "vertical" noise events from VSP information. As described above, VSP information, such as the VSP information illustrated in FIG. 4, may comprise seismic data over time in channels or traces that are associated with a particular depth of a formation. The VSP information may be generated through one or more sweeps in which seismic data over a finite time duration is collected for all channels or traces. Each sweep may comprise a separate seismic data record that may be "stacked" to form a complete VSP data set.

Conventional stacking processes are generally used to attenuate random noise and simultaneously boost the SNR of the acquired sweeps. This is typically achieved by taking the mean over all recorded sweeps. For a single trace this is given by $$\bar{a}_j(t) = \frac{1}{N}\sum_{i=1}^{N} a_{i,j}(t) \quad j=(1,2,3,\ldots,M),$$

where N is the number of acquired sweeps, $a_{i,j}(t)$ is the value of trace j originating from the $i^{th}$ sweep at time instant t, and $\bar{a}_j(t)$ is the resulting mean stacked trace. However, such a stacking strategy is only effective if the noise components in all traces are normally distributed, stationary and of equal magnitude, conditions which are typically not met when using DAS for VSP. This may be because DAS systems measure the dynamic strain caused by the seismic wave impinging on the fiber using a highly coherent, narrow-bandwidth interrogation light signal. Due to the intrinsic Rayleigh backscatter of the optical fiber a portion of the injected light signal is constantly back-reflected and captured in the interrogator. However, due to the randomness of the Rayleigh backscattering effect the optical energy of the back-reflected signal tends to vary greatly over time. This is reflected in the noise floor of the DAS data stream which tends to deteriorate whenever the optical power of the back-reflected signal decreases.

According to aspects of the present disclosure, a variance-based weighted stacking scheme may be used for VSP information captured using a DAS system. In certain embodiments, the variance-based weighted stacking scheme may comprise applying the following variance-based weighted stacking equation to at least some of the traces of the VSP information:

$$\hat{a}_j(t) = \frac{1}{\sum_{i=1}^{N} \frac{1}{\sigma_{i,j}^2}} \sum_{i=1}^{N} \frac{1}{\sigma_{i,j}^2} a_{i,j}(t)$$

where $\sigma_{i,j}^2$ is the variance of DAS VSP trace j originating from the $i^{th}$ sweep, and $\hat{a}_j(t)$ is the outcome of the weighted stacking operation. The variance-based weighted stacking equation may be implemented under the assumption that the seismic signal contained in each acquired sweep is stationary; that is, neither the seismic source nor the communication channel (physical transmission medium) is expected to vary in between sweeps. The equation also assumes the noise statistics in DAS follow a generally Gaussian distribution.

An example process for noise reduction through a variance-based weighted stacking scheme is illustrated in FIG. 10. Step 1000 may comprise receiving seismic data from a DAS system, where the seismic data comprises a plurality of seismic data records that are each associated with a different sweep of the DAS system. The seismic data may comprise the set of all seismic data records collected by a DAS system over a particular time period, or a subset of all the seismic data records. The received seismic data also may comprise intermediate seismic data in which "vertical" noise events and/or "horizontal" noise events have been removed using a process similar to the one described above with reference to FIG. 6.

At step 1002, acoustic data for each trace of each seismic data record may be divided into time windows of equal length. For instance, one sweep of a DAS system may capture seismic data spanning 15 seconds for 30 traces or channels. Assuming a one-second time window is selected, the sweeps may be divided into 450 equal windows (15 windows per channel times 30 channels). The duration for the window is not required to be one second, however, and can be selected to comprise any duration depending on the required granularity, but should be of sufficient duration to provide a robust variance estimation. In certain embodiments, the windows can be designed to overlap to produce a finer granularity in the variance calculation, described below.

At step 1004, a variance value for each time window of each seismic data record may be calculated for each time window of each seismic data record. The variance may be given as the squared standard deviation calculated over each window or be calculated with reference to the in-phase and quadrature components of the seismic data within the time window. For instance, when using the in-phase and quadrature components the variance value for a given window may be calculated using the following equation 1 ($I^2+Q^2$). This may produce for each channel or trace a matrix of variance values, arranged by sweep and time window. At step 1006, a weighted stack for each trace of the DAS system may be calculated based, at least in part using the calculated variance values. In certain embodiments, calculating the weighted stack may comprise calculating the weighted stack using the variance-based weighted stacking equation described above. Specifically, the calculated variance values may comprise the values associated with variable $\sigma_{i,j}^2$.

The calculated weighted stacks for the traces of the DAS systems may be combined into total weighted and stacked DAS VSP record. In certain embodiments, this total weighted and stacked DAS VSP record may be used to determine formation or borehole characteristics, or may undergo further noise elimination steps. For instance, the total weighted and stacked DAS VSP may be processed further to remove "horizontal" noise using techniques similar to those described above with reference to FIG. 6.

Modifications, additions, or omissions may be made to FIG. 10 without departing from the scope of the present disclosure. For example, although the steps recite performing calculations with respect to all traces and all sweeps, it should be appreciated that one or more traces or sweeps may be excluded from the DAS data depending on noise considerations similar to those described above with respect to FIG. 6, or other considerations that would be appreciated by one of ordinary skill in the art in view of this disclosure. Additionally, additional steps may be added to or one or more steps may be removed from the process described in FIG. 10.

One optional step that may be included within the process described with respect to FIG. 10 comprises smoothing the calculated variance values. The smoothing step may be used, for instance, once the variance values are calculated at step 1004 but before the weighted stacks are calculated. The smoothing step may comprise smoothing the calculated variance values over the time windows using one or more interpolation methods. Example methods include, but are not limited to, linear interpolation, an example of which is illustrated in FIG. 11. As depicted, the original calculated variance values 1100 comprise abrupt transitions that may affect the clarity of the resulting weighted stack. The smoothed variance values 1102 may produce a clearer weighted stack that may produce, for instance, more accurate characteristics of the formation and/or borehole associated with it.

In certain embodiments, rather than when the seismic source is a vibrator, the VSP data set recorded from each sweep can be stacked by \ either first correlating or inverting with a reference sweep, or optionally stacking the sweeps as described above and then correlating or inverting with the reference sweep. If the seismic source is an air gun, weight drop, dynamite, or other such impulsive source, then repeated source firings at the same location can be directly stacked together without correlation or inversion of the reference source signature.

According to aspects of the present disclosure, an example system may include a DAS data collection system coupled to at least one optical fiber at least partially positioned within a wellbore. An information handling system may be coupled to the DAS data collection system. The information handling system may comprise a processor and a memory device coupled to the processor, the memory device containing a set of instruction that, when executed by the processor, cause the processor to receive seismic data from the DAS data collection system, the seismic data comprising seismic traces associated with a plurality of depths in the wellbore; determine a quality factor for each seismic trace; and remove one or more seismic traces from the seismic data based, at least in part, on the determined quality factors.

In one or more embodiments described in the preceding paragraph, the set of instructions that cause the processor to determine the quality factor for each seismic trace may further cause the processor to determine the quality factor for each seismic trace using a comparison between an acoustic activity of each trace and a reference value corresponding to a desired acoustic activity in the absence of noise. In one or more embodiments described in the preceding paragraph, the set of instructions that cause the processor to determine the quality factor for each seismic trace may further cause the processor to determine the quality factor for each seismic trace using a comparison between an acoustic activity of each trace and the acoustic activity of other seismic traces in the seismic data. In one or more embodiments described in the preceding paragraph, the set of instructions that cause the processor to determine the quality factor for each seismic trace may further cause the processor to determine the quality factor for each seismic trace using a comparison between an acoustic activity at certain frequencies of each trace and at least one of a reference value corresponding to desired acoustic activity in the absence of noise; and the acoustic activity at the certain frequencies of other seismic traces in the seismic data. In one or more embodiments described in the preceding paragraph, the system of claim 1, the seismic data with one or more traces removed comprises intermediate seismic data; and the set of instructions may further cause the processor to generate at least one noise pilot trace for the intermediate seismic data; and subtract the at least one noise pilot trace from the intermediate seismic data.

In one or more embodiments described in the preceding two paragraphs, the set of instructions that cause the processor to generate at least one noise pilot trace for the intermediate seismic data may further cause the process to determine, at each time instant, an acoustic activity average across the one or more seismic traces of the intermediate seismic data; and generate the one or more noise pilot traces using the determined acoustic activity averages for the one or more seismic traces of the intermediate seismic data.

In one or more embodiments described in the preceding three paragraphs, the received seismic data comprises a plurality of seismic data records that are each associated with a different sweep of the DAS system; and the set of instructions further cause the processor to divide acoustic activity associated with each trace of each seismic data record into time windows of equal length; calculate variance value for each time window of each seismic data record; calculate a weighted stack for each trace of the DAS system based, at least in part, on the calculated variance values; and combine the weighted stacks for each trace into weighted seismic data for the DAS system.

In one or more embodiments described in the preceding paragraph, the set of instructions that cause the processor to calculate the weighted stack for each trace of the DAS system based, at least in part, on the calculated variance values further cause the processor to calculate the weighted stack for each trace of the DAS system using the following equation $$\hat{a}_j(t) = \frac{1}{\sum_{i=1}^{N} \frac{1}{\sigma_{i,j}^2}} \sum_{i=1}^{N} \frac{1}{\sigma_{i,j}^2} a_{i,j}(t)$$

where $\sigma_{i,j}^2$ comprises the calculated variance of trace j originating from an $i^{th}$ sweep; N comprises a total number of sweeps, $a_{i,j}(t)$ comprises an acoustic activity value of trace j originating from the $i^{th}$ sweep at time instant t, and $\hat{a}_j(t)$ comprises the weighted stack. In one or more embodiments described in the preceding paragraph, the set of instructions may further cause the processor to smooth the calculated variance values using one or more interpolation methods. In one or more embodiments described in the preceding paragraph, the set of instructions that cause the processor to determine the quality factor for each seismic trace may further cause the processor to determine the quality factor for the weighted stack of each seismic trace; or the seismic data with one or more traces removed comprises intermediate seismic data, and the set of instructions that cause the processor to divide acoustic activity associated with each trace of each seismic data record into time windows of equal length further cause the processor to divide acoustic activity associated with each trace of each seismic data record of the intermediate seismic data into time windows of equal length.

According to aspects of the present disclosure, an example method may comprise at least partially positioning within a wellbore an optical fiber of a distributed acoustic sensing (DAS) data collection system, and receiving seismic data from the DAS data collection system, the seismic data comprising seismic traces associated with a plurality of depths in the wellbore. A quality factor may be determined for each seismic trace. One or more seismic traces may be removed from the seismic data based, at least in part, on the determined quality factors.

In one or more embodiments described in the preceding paragraph, determining the quality factor for each seismic trace may comprise comparing an acoustic activity of each trace to a reference value corresponding to a desired acoustic activity in the absence of noise. In one or more embodiments described in the preceding paragraph, determining the quality factor for each seismic trace may comprise comparing an acoustic activity of each trace to the acoustic activity of other seismic traces in the seismic data. In one or more embodiments described in the preceding paragraph, determining the quality factor for each seismic trace may comprise comparing acoustic activity at certain frequencies of each trace to at least one of a reference value corresponding to desired acoustic activity in the absence of noise; and acoustic activity at the certain frequencies of the other traces within the seismic data. In one or more embodiments described in the preceding paragraph, the seismic data with one or more traces removed comprises intermediate seismic data; and the method may further comprise generating at least one noise pilot trace for the intermediate seismic data; and subtracting the at least one noise pilot trace from the intermediate seismic data.

In one or more embodiments described in the preceding two paragraphs, generating at least one noise pilot trace for the intermediate seismic data may comprise determining, at each time instant, an acoustic average for the one or more seismic traces of the intermediate seismic data; and generating the one or more noise pilot traces using the determined acoustic averages for the one or more seismic traces of the intermediate seismic data.

In one or more embodiments described in the preceding three paragraphs, the received seismic data comprises a plurality of seismic data records that are each associated with a different sweep of the DAS system; and the method may further comprise dividing acoustic activity associated with each trace of each seismic data record into time windows of equal length; calculating variance value for each time window of each seismic data record; calculating a weighted stack for each trace of the DAS system based, at least in part, on the calculated variance values; and combining the weighted stacks for each trace into weighted seismic data for the DAS system.

In one or more embodiments described in the preceding paragraph, calculating the weighted stack for each trace of the DAS system based, at least in part, on the calculated variance values comprises calculating the weighted stack for each trace using the following equation $$\hat{a}_j(t) = \frac{1}{\sum_{i=1}^{N} \frac{1}{\sigma_{i,j}^2}} \sum_{i=1}^{N} \frac{1}{\sigma_{i,j}^2} a_{i,j}(t)$$

where $\sigma_{i,j}^2$ comprises the calculated variance of trace j originating from an $i^{th}$ sweep; N comprises a total number of sweeps, $a_{i,j}(t)$ comprises an acoustic activity value of trace j originating from the $i^{th}$ sweep at time instant t, and $\hat{a}_j(t)$ comprises the weighted stack. In one or more embodiments described in the preceding paragraph, the method may further comprise smoothing the calculated variance values using one or more interpolation methods. In one or more embodiments described in the preceding paragraph, determining the quality factor for each seismic trace comprises determine the quality factor for the weighted stack of each seismic trace; or the seismic data with one or more traces removed comprises intermediate seismic data, and dividing acoustic activity associated with each trace of each seismic data record into time windows of equal length comprises dividing acoustic activity associated with each trace of each seismic data record of the intermediate seismic data into time windows of equal length.

The present disclosure is therefore well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A system, comprising:
    a distributed acoustic sensing (DAS) data collection system coupled to at least one optical fiber at least partially positioned within a wellbore; and
    an information handling system coupled to the DAS data collection system, the information handling system comprising a processor and a memory device coupled to the processor, the memory device containing a set of instruction that, when executed by the processor, cause the processor to
        receive seismic data from the DAS data collection system, the seismic data comprising one or more seismic traces associated with a plurality of depths in the wellbore;
        determine a quality factor for the one or more seismic traces, wherein identification of one or more noise channels relative to one or more other noise channels is based, at least in part, on the quality factor, wherein noise of at least one of the one or more noise channels is caused by channel fading, and wherein the noise is inherent to the DAS data collection system; and
        remove at least one seismic trace from the one or more seismic traces based, at least in part, on the quality factor determined for the at least one seismic trace.

2. The system of claim 1, wherein the set of instructions that cause the processor to determine the quality factor further cause the processor to determine the quality factor using a comparison between an acoustic activity of each seismic trace of the one or more seismic traces and a reference value corresponding to a desired acoustic activity in the absence of noise.

3. The system of claim 1, wherein the set of instructions that cause the processor to determine the quality factor further cause the processor to determine the quality factor using a comparison between an acoustic activity of each seismic trace of the one or more seismic traces and the acoustic activity of other seismic traces in the seismic data.

4. The system of claim 1, wherein the set of instructions that cause the processor to determine the quality factor further cause the processor to determine the quality factor for the one or more seismic traces using a comparison between an acoustic activity at certain frequencies of each seismic trace of the one or more seismic traces and at least one of
    a reference value corresponding to desired acoustic activity in the absence of noise; and
    the acoustic activity at the certain frequencies of one or more other seismic traces in the seismic data.

5. The system of claim 1, wherein
    the seismic data with the at least one seismic trace removed comprises intermediate seismic data; and
    the set of instructions further cause the processor to
        generate at least one noise pilot trace for the intermediate seismic data; and
        subtract the at least one noise pilot trace from the intermediate seismic data.

6. The system of claim 5, wherein the set of instructions that cause the processor to generate at least one noise pilot trace for the intermediate seismic data further cause the processor to
    determine, at each time instant, an acoustic activity average across the one or more seismic traces of the intermediate seismic data; and
    generate the one or more noise pilot traces using the determined acoustic activity averages for the one or more seismic traces of the intermediate seismic data.

7. The system of claim 1, wherein
    the received seismic data comprises a plurality of seismic data records that are each associated with a different sweep of the DAS system; and the set of instructions further cause the processor to
divide acoustic activity associated with each trace of each seismic data record into time windows of equal length;
calculate variance value for each time window of each seismic data record;
calculate a weighted stack for each trace of the DAS system based, at least in part, on the calculated variance values; and
combine the weighted stacks for each trace into weighted seismic data for the DAS system.

8. The system of claim 7, wherein the set of instructions that cause the processor to calculate the weighted stack for each trace of the DAS system based, at least in part, on the calculated variance values further cause the processor to calculate the weighted stack for each trace of the DAS system using the following equation $$\hat{a}_j(t) = \frac{1}{\sum_{i=1}^{N} \frac{1}{\sigma_{i,j}^2}} \sum_{i=1}^{N} \frac{1}{\sigma_{i,j}^2} a_{i,j}(t)$$

where $\sigma_{i,j}^2$ comprises the calculated variance of trace j originating from an $i^{th}$ sweep; N comprises a total number of sweeps, $a_{i,j}(t)$ comprises an acoustic activity value of trace j originating from the $i^{th}$ sweep at time instant t, and $\hat{a}_j(t)$ comprises the weighted stack.

9. The system of claim 7, wherein the set of instructions further cause the processor to smooth the calculated variance values using one or more interpolation methods.

10. The system of claim 7, wherein
the set of instructions that cause the processor to determine the quality factor further cause the processor to determine the quality factor for the weighted stack of each seismic trace; or
the seismic data with the at least one seismic trace removed comprises intermediate seismic data, and the set of instructions that cause the processor to divide acoustic activity associated with each trace of each seismic data record into time windows of equal length further cause the processor to divide acoustic activity associated with each trace of each seismic data record of the intermediate seismic data into time windows of equal length.

11. A method, comprising:
at least partially positioning within a wellbore an optical fiber of a distributed acoustic sensing (DAS) data collection system;
receiving seismic data from the DAS data collection system, the seismic data comprising one or more seismic traces associated with a plurality of depths in the wellbore;
determining a quality factor for the one or more seismic traces, wherein identification of one or more noise channels relative to one or more other noise channels is based, at least in part, on the quality factor, wherein noise of at least one of the one or more noise channels is caused by channel fading, and wherein the noise is inherent to the DAS data collection system; and
removing at least one seismic trace from the one or more seismic traces based, at least in part, on the determined quality factor determined for the at least one seismic trace.

12. The method of claim 11, wherein determining the quality factor comprises comparing an acoustic activity of each trace to a reference value corresponding to a desired acoustic activity in the absence of noise.

13. The method of claim 11, wherein determining the quality factor for each seismic trace comprises comparing an acoustic activity of each seismic trace of the one or more seismic traces to the acoustic activity of one or more other seismic traces in the seismic data.

14. The method of claim 11, wherein determining the quality factor comprises comparing acoustic activity at certain frequencies of each seismic trace of the one or more seismic traces to at least one of
a reference value corresponding to desired acoustic activity in the absence of noise; and
acoustic activity at the certain frequencies of the other traces within the seismic data.

15. The method of claim 11, wherein
the seismic data with the at least one seismic trace removed comprises intermediate seismic data; and
the method further comprises
generating at least one noise pilot trace for the intermediate seismic data; and
subtracting the at least one noise pilot trace from the intermediate seismic data.

16. The method of claim 15, wherein generating at least one noise pilot trace for the intermediate seismic data comprises
determining, at each time instant, an acoustic average for the one or more seismic traces of the intermediate seismic data; and
generating the one or more noise pilot traces using the determined acoustic averages for the one or more seismic traces of the intermediate seismic data.

17. The method of claim 11, wherein
the received seismic data comprises a plurality of seismic data records that are each associated with a different sweep of the DAS system; and
the method further comprises
dividing acoustic activity associated with each trace of each seismic data record into time windows of equal length;
calculating variance value for each time window of each seismic data record;
calculating a weighted stack for each trace of the DAS system based, at least in part, on the calculated variance values; and
combining the weighted stacks for each trace into weighted seismic data for the DAS system.

18. The method of claim 17, wherein calculating the weighted stack for each trace of the DAS system based, at least in part, on the calculated variance values comprises calculating the weighted stack for each trace using the following equation $$\hat{a}_j(t) = \frac{1}{\sum_{i=1}^{N} \frac{1}{\sigma_{i,j}^2}} \sum_{i=1}^{N} \frac{1}{\sigma_{i,j}^2} a_{i,j}(t)$$

where $\sigma_{i,j}^2$ comprises the calculated variance of trace j originating from an $i^{th}$ sweep; N comprises a total number of sweeps, $a_{i,j}(t)$ comprises an acoustic activity value of trace j originating from the $i^{th}$ sweep at time instant t, and $â_j(t)$ comprises the weighted stack.

19. The method of claim 17, further comprising smoothing the calculated variance values using one or more interpolation methods.

20. The method of claim 17, wherein determine the quality factor comprises determine the quality factor for the weighted stack of each seismic trace; or the seismic data with the at least one seismic trace removed comprises intermediate seismic data, and dividing acoustic activity associated with each trace of each seismic data record into time windows of equal length comprises dividing acoustic activity associated with each trace of each seismic data record of the intermediate seismic data into time windows of equal length.

* * * * *